United States Patent
Onodera

(10) Patent No.: US 11,620,259 B2
(45) Date of Patent: Apr. 4, 2023

(54) ELECTRONIC DEVICE, METHOD FOR CONTROLLING ELECTRONIC DEVICE, AND NON-TRANSITORY COMPUTER READABLE MEDIUM

(71) Applicant: CANON KABUSHIKI KAISHA, Tokyo (JP)

(72) Inventor: Yuma Onodera, Zama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 16/850,463

(22) Filed: Apr. 16, 2020

(65) Prior Publication Data

US 2020/0334202 A1 Oct. 22, 2020

(30) Foreign Application Priority Data

Apr. 18, 2019 (JP) .............................. JP2019-079313

(51) Int. Cl.
*G06F 16/00* (2019.01)
*G06F 16/14* (2019.01)
*G06F 11/30* (2006.01)
*G06F 16/182* (2019.01)

(52) U.S. Cl.
CPC ........ *G06F 16/144* (2019.01); *G06F 11/3034* (2013.01); *G06F 11/3058* (2013.01); *G06F 16/156* (2019.01); *G06F 16/182* (2019.01)

(58) Field of Classification Search
CPC ............... G06F 16/144; G06F 11/3034; G06F 11/3058; G06F 16/156; G06F 16/182; G06F 11/3055
See application file for complete search history.

(56) References Cited

U.S. PATENT DOCUMENTS

2011/0022982 A1 * 1/2011 Takaoka .............. G06F 3/04883
715/810

FOREIGN PATENT DOCUMENTS

| JP | 2005-352779 A | | 12/2005 | |
|---|---|---|---|---|
| JP | 2006-237963 A | | 9/2006 | |
| JP | 2008289102 A | * | 11/2008 | ............. H04H 60/27 |
| JP | 2011257786 A | * | 12/2011 | |

* cited by examiner

*Primary Examiner* — Ashish Thomas
*Assistant Examiner* — Suman Rajaputra
(74) *Attorney, Agent, or Firm* — Cowan, Lebowitz & Latman, P.C.

(57) ABSTRACT

An electronic device comprising: a setting unit configured to set a search condition including a first search item and a second search item based on a user operation; a storage control unit configured to perform control to store the search condition set by the setting unit; and a search unit configured to search for a content based on the search condition set by the setting unit from a storage destination serving as a search target, wherein in a case in which a storage destination serving as a search target is changed after the search condition is stored by control of the storage control unit, the setting unit 1) uses a stored search condition as a setting candidate as for the first search item and 2) does not use a stored search condition as a setting candidate as for the second search item.

16 Claims, 5 Drawing Sheets

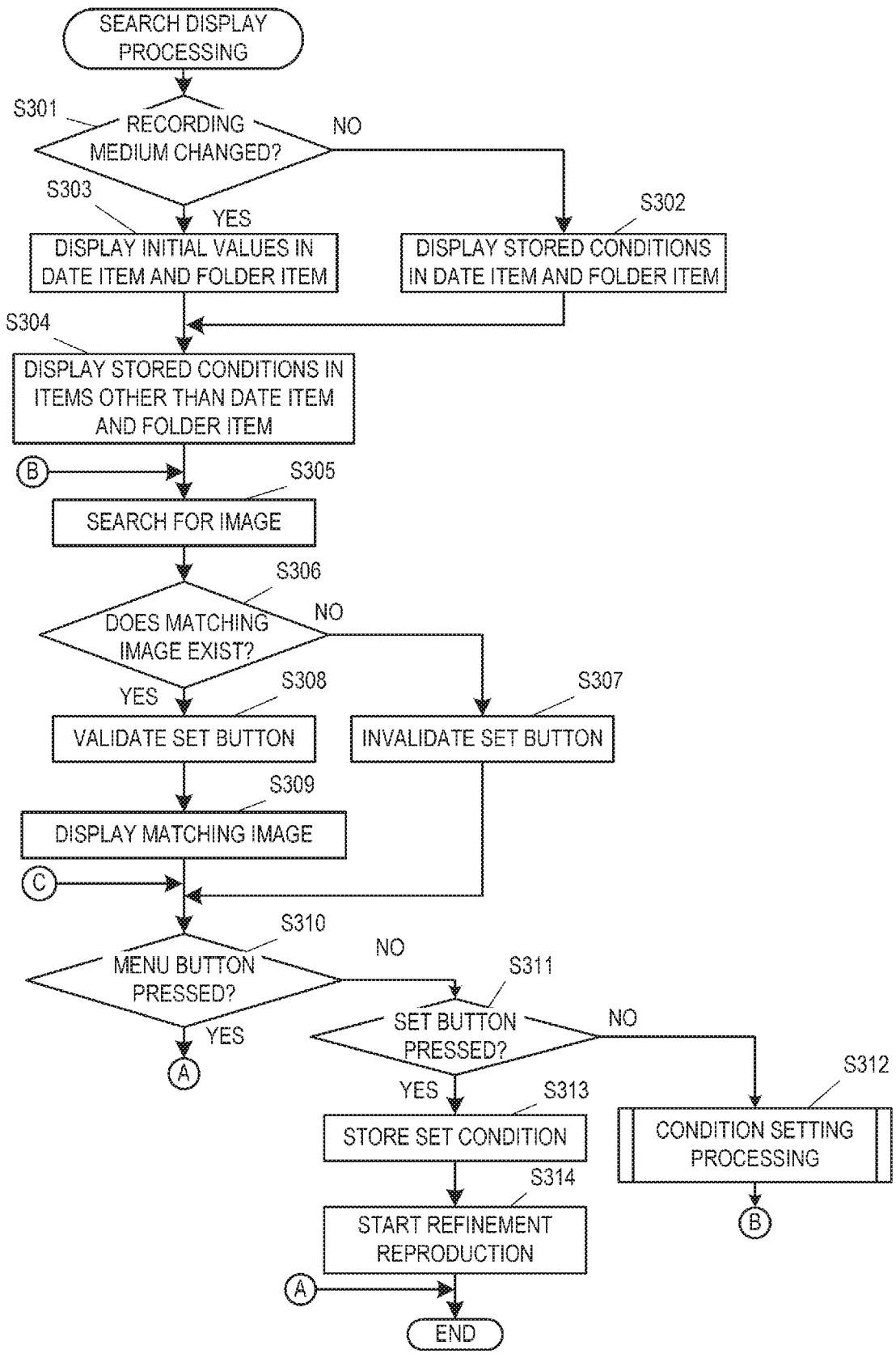

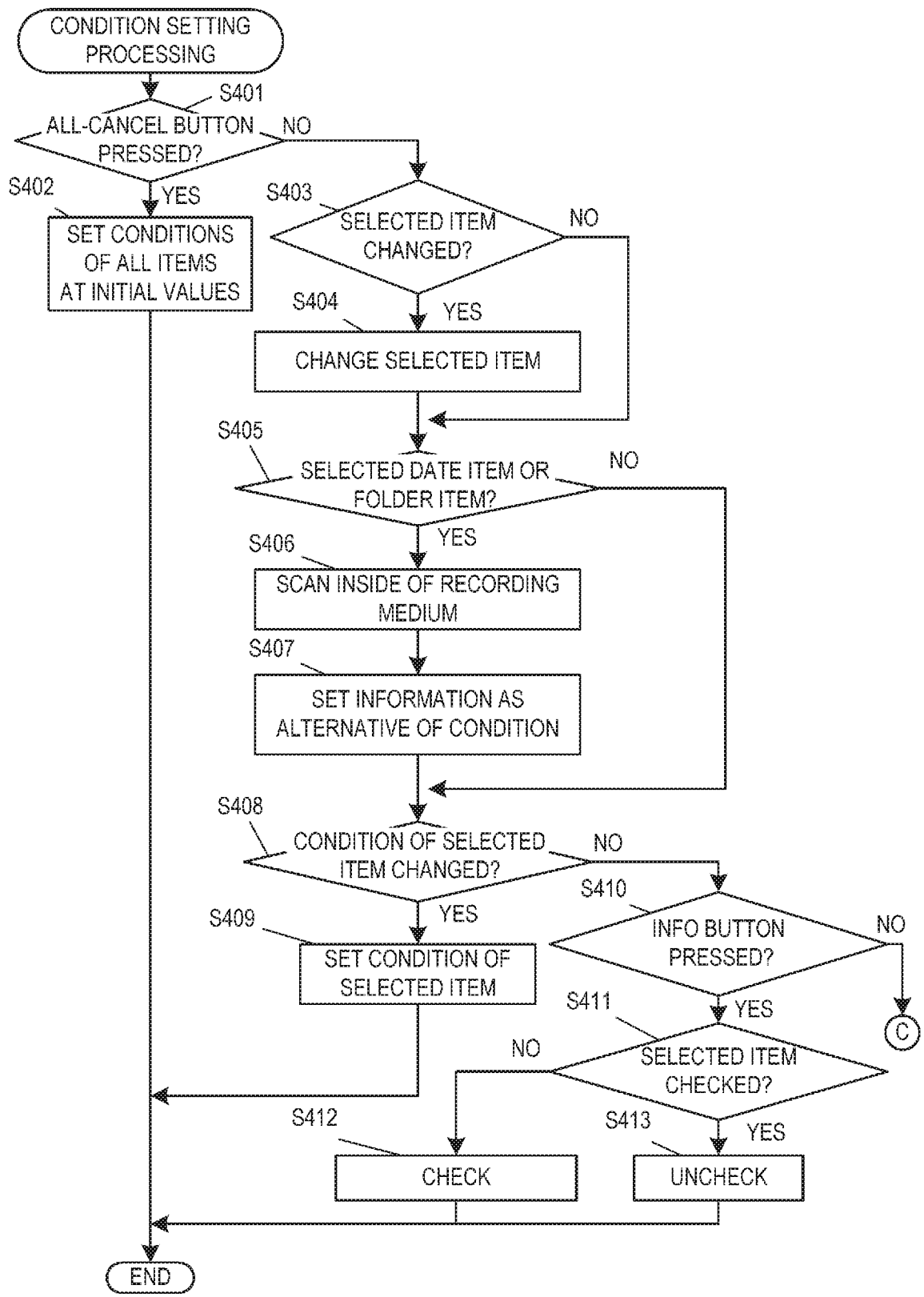

ELECTRONIC DEVICE, METHOD FOR CONTROLLING ELECTRONIC DEVICE, AND NON-TRANSITORY COMPUTER READABLE MEDIUM

BACKGROUND OF THE INVENTION

Field of the Invention

The present invention relates to an electronic device, a method for controlling an electronic device, and a non-transitory computer readable medium.

Description of the Related Art

In recent years, the capacity of recording media connected to electronic devices has been increased, which makes it possible to store a large amount of contents in the recording media. Therefore, in order to efficiently find desired contents from a large amount of contents, users set search conditions in a plurality of items and search for content data according to conditions based on the search conditions.

Japanese Patent Application Laid-open No. 2006-237963 discloses an image search technology with which a user is allowed to find a desired image from images recorded on a recording medium.

Japanese Patent Application Laid-open No. 2005-352779 discloses a technology in which a set search condition is stored and the search condition is taken over even after the change of a recording medium serving as a search target to reduce the operation of designating a search condition for a recording medium after the change.

As described above, a search condition at the search of a content is desirably stored in an electronic device so that the necessity to reset the search condition is eliminated when search is performed again under the same condition. However, when the search conditions of all items used in previous search are used to perform search again after the change of a recording medium, there is a case that a content satisfying the search conditions of all the items does not exist in a recording medium. That is, an image matching the search conditions may not be displayed even though unnecessary search is performed in an electronic device.

SUMMARY OF THE INVENTION

The present invention has an object of providing an electronic device capable of more effectively taking over the search conditions of a content used in previous search.

An aspect of the invention is:
an electronic device comprising:
at least one memory and at least one processor which function as:
a setting unit configured to set a search condition including a first search item and a second search item based on a user operation;
a storage control unit configured to perform control to store the search condition set by the setting unit; and
a search unit configured to search for a content based on the search condition set by the setting unit from a storage destination serving as a search target, wherein
in a case in which a storage destination serving as a search target is changed after the search condition is stored by control of the storage control unit, the setting unit 1) uses a stored search condition as a setting candidate as for the first search item and 2) does not use a stored search condition as a setting candidate as for the second search item.

Further features of the present invention will become apparent from the following description of exemplary embodiments with reference to the attached drawings.

BRIEF DESCRIPTION OF THE DRAWINGS

FIG. 3 is a flowchart showing search display processing according to the first embodiment; and FIG. 4 is a flowchart showing condition setting processing according to the first embodiment.

DESCRIPTION OF THE EMBODIMENTS

Hereinafter, an electronic device that more effectively realizes the search and display of a content recorded on a recording medium using a search condition used in previous content search will be described.

Here, when a search condition used in previous search is reused after the change of a recording medium serving as a search target, a content satisfying the search condition may not exist in a recording medium depending on the item (search item) of the search condition. In this case, even one content does not match the search condition when search is performed again. For example, in the case of an item such as a date and a folder that is highly likely to be a different search condition depending on a storage medium, a content may not match a stored search condition when search is performed again using a search condition in previous search after the change of a recording medium.

Further, even when a content matching a search condition does not exist in a recording medium, all the contents in the recording medium are subjected to search processing. Therefore, in such a case, a matching image is not displayed as a search result even though it takes time to display of the search result.

Accordingly, preferred embodiments of the present invention will be described below in order to solve the above problem.

First Embodiment

Configuration of Electronic Device

Figure 1:
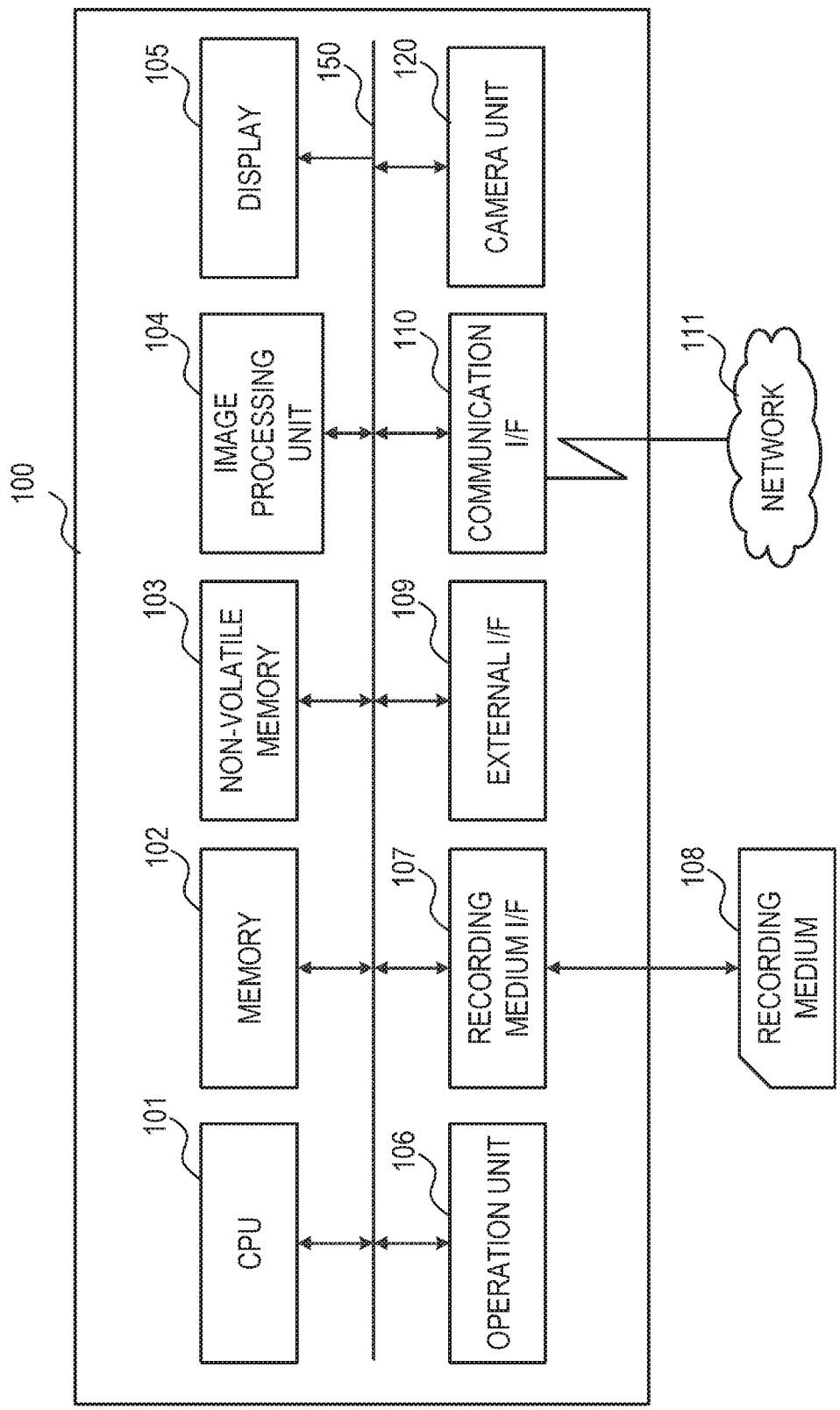
FIG. 1 is a block diagram of an electronic device according to a first embodiment.

As a first embodiment, an example of the configuration of an electronic device 100 serving as an example of a device to which the present invention is applicable will be described using the block diagram of FIG. 1. The electronic device 100 is configurable by a digital camera, a personal computer (hereinafter called a PC), or the like.

The electronic device 100 has a CPU 101, a memory 102, a non-volatile memory 103, an image processing unit 104, a display 105, an operation unit 106, a recording medium I/F 107, an external I/F 109, a communication I/F 110, a camera unit 120, and an internal bus 150. The respective function units other than the internal bus 150 in the electronic device 100 are connected to the internal bus 150 and capable of inputting and outputting data to and from each other via the internal but 150. Further, the electronic device 100 is connected to a recording medium 108 and a network 111.

The CPU 101 is, for example, a control unit that controls the respective function units of the electronic device 100 using the memory 102 as a work memory according to a program stored in the non-volatile memory 103.

The memory 102 includes, for example, a RAM (such as a volatile memory using a semiconductor element).

The non-volatile memory 103 stores an image (image data) or sound (sound data), other data, various programs to be operated by the CPU 101, or the like. The non-volatile memory 103 is, for example, a storage unit including a hard disk (HD), a ROM, or the like.

The image processing unit 104 applies various image processing to an image stored in the non-volatile memory 103 or the recording medium 108, an image signal acquired via the external I/F 109, an image acquired via the communication I/F 110, or the like on the basis of the control of the CPU 101. The image processing performed by the image processing unit 104 includes A/D conversion processing, D/A conversion processing, image coding processing, compression processing, decoding processing, expanding/shrinking processing (resizing), noise reduction processing, color conversion processing, or the like. The image processing unit 104 may include a dedicated circuit block for applying specific image processing. Further, the image processing unit 104 is not used depending on an image processing type. Instead, the CPU 101 may apply image processing according to a program.

The display 105 displays an image or a GUI screen constituting a graphical user interface (GUI) on the basis of the control of the CPU 101. For example, the CPU 101 generates a display control signal according to a program and outputs the generated display control signal to an image generation unit (not shown) of the electronic device 100. The image generation unit having acquired the display control signal generates an image signal to be displayed on the display 105 and outputs the generated image signal to the display 105. At this time, the image processing unit 104 may apply image processing to the image signal. The display 105 displays an image on the basis of the output image signal. Note that the CPU 101 may perform the processing of the image generation unit.

Note that a configuration provided in the electronic device 100 itself is limited to an interface for outputting an image signal to be displayed on the display 105. The display 105 may be an external monitor (TV or the like).

The operation unit 106 is an input unit that serves as an input device for receiving a user operation. The operation unit 106 includes a character information input device such as a keyboard, a pointing device such as a mouse and a touch panel, a button, a dial, a joystick, a touch sensor, a touch pad, or the like. Note that in the present embodiment, the touch panel is an input device that overlaps the display 105 to be flat and outputs coordinate information corresponding to a touched position. Note that in the present embodiment, the operation unit 106 is controlled by the CPU 101 and sets search conditions in a plurality of search items on the basis of a user operation.

The recording medium 108 such as a memory card, a CD, and a DVD is attachable into the recording medium I/F 107. Further, the recording medium I/F 107 performs the reading of data from the attached recording medium 108 and the writing of data into the recording medium 108 on the basis of the control of the CPU 101.

In addition, the recording medium I/F 107 detects the attachment/detachment of the recording medium 108. Note that even if the main power of the electronic device 100 is turned off, the recording medium I/F 107 is allowed to detect the attachment/detachment of the recording medium 108 by the control of a sub-CPU (not shown). When detecting the attachment or detachment of the recording medium 108, the recording medium I/F 107 notifies the CPU 101 of the attachment or detachment. When receiving the notification of the attachment/detachment, the CPU 101 stores "information indicating whether a recording medium has been changed" in the non-volatile memory 103.

Note that when the attachment/detachment of the recording medium 108 is detected in a state in which the main power of the electronic device 100 is turned off, the sub-CPU temporarily turns on the power and then notifies the CPU 101 of the attachment/detachment. The CPU 101 stores the "information indicating whether a recording medium has been changed" in the non-volatile memory 103 and then automatically turns off the power of the electronic device 100.

Here, the CPU 101 may determine the "information indicating whether a recording medium has been changed" in the following manner. Note that an originally-attached recording medium and a newly-attached recording medium will be assumed as a recording medium 108A and a recording medium 108B, respectively, to make a description simple.

First, the CPU 101 stores information on the recording status of the recording medium 108A such as the recorded capacity, the remaining capacity, the number of files, and the number of folders of the attached recording medium 108A in the non-volatile memory 103 in advance. When receiving a notification that the attachment of the recording medium 108B has been detected from the recording medium I/F 107, the CPU 101 compares information on the recording medium 108A that has been stored in the non-volatile memory 103 with information (status) on the newly-attached recording medium 108B. Thus, the CPU 101 determines whether the newly-attached recording medium 108B is the same as the previously-attached recording medium 108A. Here, the two recording media 108A and 108B may be determined to be the same when at least any of the recorded capacity, the remaining capacity, the number of files, and the number of folders is the same. Alternatively, the two recording media 108A and 108B may be determined to be the same only when all of the recorded capacity, the remaining capacity, the number of files, and the number of folders are the same. In addition, when unique discriminations ID are added to the respective recording media 108A and 108B, the two recording media 108A and 108B may be determined to be the same if the discrimination IDs are the same. When the two recording media 108A and 108B are not determined to be the same, the CPU 101 stores "information indicating that a recording medium has been changed" as "information indicating whether a recording medium has been changed." Note that when the two recording media 108A and 108B are determined to be the same, the CPU 101 does not store the "information indicating that a recording medium has been changed" for this attachment.

The external I/F 109 is an interface that is connected to an external device by a wired cable or wirelessly and used to input and output an image signal or a sound signal.

The communication I/F 110 is an interface that communicates with an external device, the network 111, or the like to transmit and receive various data such as a file and a command.

The camera unit 120 is an imaging unit that captures an image of a subject (target). In the present embodiment, an image file, a sound file, or the like of a still image, a moving image, or the like captured by the camera unit 120, a sound file, or the like is recorded on the recording medium 108. Accordingly, in the present embodiment, data of an image captured by the camera unit 120 is an image search target.

Screen for Image Search

First, a screen (GUI screen) used by a user to search for an image in the recording medium 108 will be described with reference to FIGS. 2A and 2B.

Reproduction Menu Screen

Figure 2A:
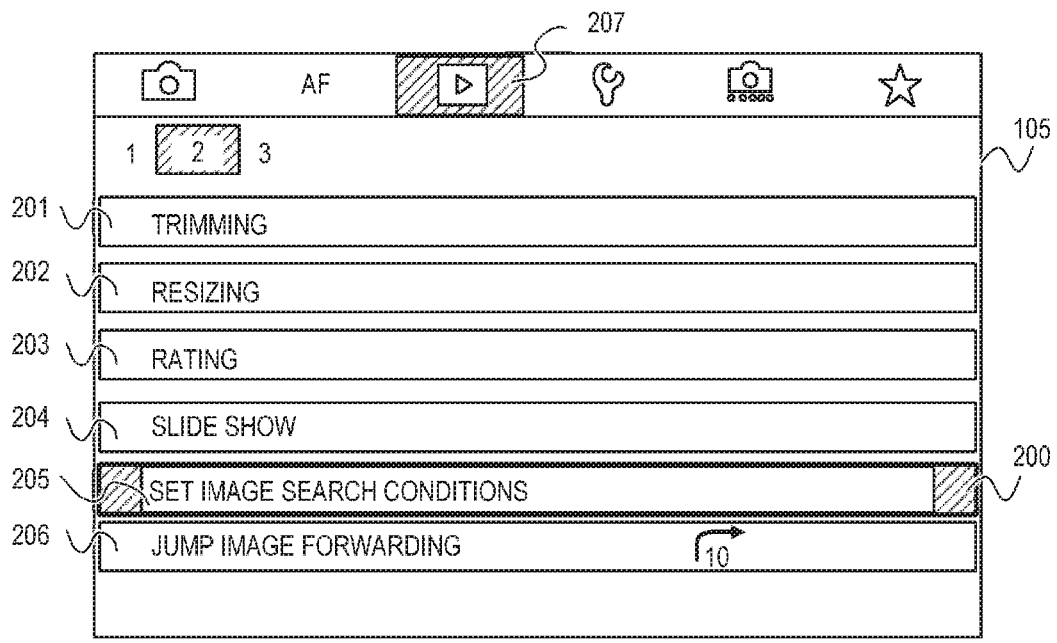
FIGS. 2A to 2D are diagrams showing the screen of a display according to the first embodiment.

FIG. 2A shows a reproduction menu screen in a state in which a reproduction tab 207 is selected when a menu button (not shown) displayed on the display 105 has been selected or after a menu button included in the operation unit 106 has been pressed. In this state, the user is allowed to perform settings or control on an image recorded on the recording medium 108. On the reproduction menu screen, a trimming item 201, a resizing item 202, a rating item 203, a slide-show item 204, an set image search condition item 205, a jump image-forwarding item 206, and the like are displayed. Note that these respective items are selectable when the user touches the respective items displayed on the display 105 or when the user operates a cross button or a select button (not shown) that is a press button included in the operation unit 106.

When the trimming item 201 is selected, the CPU 101 partially cuts out a region of an image recorded on the recording medium 108 and records (stores) the cut-out region on the recording medium 108 as another image according to a user operation.

When the resizing item 202 is selected, the CPU 101 reduces the number of pixels of an image recorded on the recording medium 108 and records the image on the recording medium 108 as another image according to a user operation.

When the rating item 203 is selected, the CPU 101 makes an evaluation of an image recorded on the recording medium 108 according to a user operation. The user is allowed to evaluate an image by using, for example, one to five stars.

When the slide-show item 204 is selected, the CPU 101 sequentially reproduces (reproduces a slide show of) images recorded on the recording medium 108 according to a user operation.

Figure 2B:
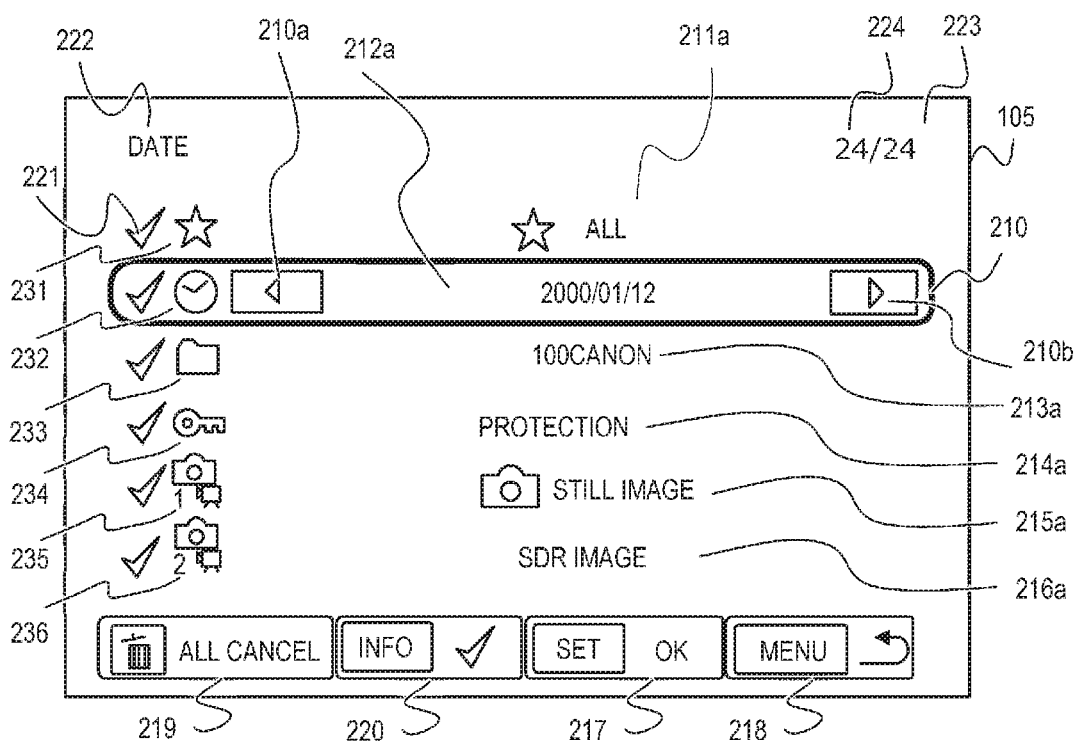

When the set image search condition item 205 is selected, the CPU 101 transitions to a condition setting screen shown in FIG. 2B and narrows down an image to be reproduced among images recorded on the recording medium 108 according to a user operation. Note that in an example shown in FIG. 2A, a cursor 200 (selection frame) surrounds (indicates) the set image search condition item 205. Therefore, when the user presses the select button that is a press button included in the operation unit 106 in this state, the display of the display 105 transitions to the condition setting screen.

When the jump image-forwarding item 206 is selected, the CPU 101 switches an image to be displayed to a preceding or subsequent image according to a designated method as the user rotates a dial (not shown) provided on the electronic device 100. It is designated in the example shown in FIG. 2A that an image is displayed every 10 sheets, but an image may be displayed in other ways. For example, on a screen displayed when the jump image-forwarding item 206 is selected, the user is allowed to designate the display of only a moving image or a still image, the display of an image shot on a different date, or the like.

Condition Setting Screen

FIG. 2B shows the condition setting screen displayed on the display 105 when the set image search condition item 205 shown in FIG. 2A is selected. By using the screen, the user is allowed to quickly display (process) only a desired image in a lump. On the condition setting screen, a rating item 231, a date item 232, a folder item 233, a protection item 234, a file-type item 235, and a file-type item 236 are displayed as items (search items). Further, on the condition setting screen, a SET button 217, a MENU button 218, an all-cancel button 219, and an INFO button 220 are displayed as display icons. Note that the respective items and the buttons on the display 105 are a part of the operation unit 106 since the user is allowed to touch and operate the items and the buttons. Further, the operation unit 106 is provided with hardware buttons corresponding to the SET button 217, the MENU button 218, the all-cancel button 219, and the INFO button 220. The user is also allowed to perform the functions of the respective display icons by operating the corresponding hardware buttons.

In the rating item 231, a one-to-five scale is selectable as a search condition. In an example shown in FIG. 2B, "all" is selected in a search condition 211a of the rating item 231 so that any image of the one-to-five scale matches search.

In the date item 232, an image shooting date is selectable as a search condition. In the example shown in FIG. 2B, a search condition 212a in the date item 232 indicates "Jan. 12, 2000." Note that when the user manually inputs a date, the CPU 101 scans (searches and reads) the attached recording medium 108 and causes the user to select only a date existing as the shooting date (file creation date) of a recorded image (content) as an alternative. Such a date is acquirable only by reading a part inside a recording medium such as a directory entry and an index file created by scanning all files in advance without reading all data inside the recording medium.

In the folder item 233, a folder in which an image is recorded is selectable as a search condition. In the example shown in FIG. 2B, a search condition 213a of the folder item 233 indicates a folder "100CANON." Note that when the user manually inputs a folder, the CPU 101 scans (searches for and reads) the attached recording medium 108 and causes the user to select only a recorded folder as an alternative. Recorded folder information is also acquirable only by reading a part inside a recording medium like the acquisition of a date.

In the protection item 234, "protection" or "unprotection" of an image is selectable as a search condition. Here, if an image has been protected, the deletion of the image is not permitted unless the protection is cancelled in a user's image deletion operation with respect to the electronic device 100. In the example show in FIG. 2B, "unprotection" has been selected as the search condition 214a of the protection item 234.

In each of the file-type item 235 and the file-type item 236, an image (content) type is selectable as a search condition. Specifically, in the file-type item 235, a still image, a RAW image, a JPEG image, a moving image, or their combinations is selectable. In the file-type item 236, image quality such as a standard dynamic range (SDR) image and a high dynamic range (HDR) image is selectable. In the example shown in FIG. 2B, a "still image" has been selected as a search condition 215a of the file-type item 235, and a "SDR image" has been selected as a search condition 216a of the file-type item 236.

Note that when the user manually inputs the rating item 231, the protection item 234, the file-type item 235, and the file-type item 236, the CPU 101 causes the user to select previously-set alternatives regardless of the recording status of the attached recording medium 108. This is because the rating item 231, the protection item 234, the file-type item 235, and the file-type item 236 are items in which settable (inputtable) search conditions are the same regardless of the recording medium 108. On the other hand, the date item 232 and the folder item 233 are items in which settable (inputtable) search conditions are different depending on the type of the attached recording medium 108.

A cursor 210 is a selection frame indicating a target item (search item) in processing to select a search condition. In the example shown in FIG. 2B, the date item 232 has been selected as a target in the processing. Note that the cursor 210 includes direction instruction icons 210a and 210b. When these buttons are pressed by the user, the search condition of an item indicated by the cursor 210 is selected (changed). That is, when the cursor 210 is used, the operation unit 106 (the CPU 101) sets a search condition based on a user operation.

A check mark 221 is a mark indicating the item of a search target. Accordingly, it is designated that an item to which the check mark 221 has been added is used for search.

In a selected-item region 222, an item (selected item) that has been selected by the cursor 210 is displayed. In the example shown in FIG. 2B, the date item 232 has been selected by the cursor 210. Therefore, a "date" has been displayed in the selected-item region 222.

The SET button 217 is a button for searching for an image that satisfies all the search conditions of items to which the check marks 221 have been added. When the SET button 217 is selected, the CPU 101 searches for an image that satisfies all the search conditions of items to which the check marks 221 have been added in the recording medium 108 and displays the searched image.

When the MENU button 218 is selected, the CPU 101 switches the display of the display 105 from the condition setting screen to the reproduction menu screen shown in FIG. 2A.

When the all-cancel button 219 is selected, the CPU 101 cancels the check marks 221 of all the items and sets the search conditions of all the items at their initial values (initial settings). In the present embodiment, the initial values (initial settings) are setting values (settings) indicating no conditions (NULL), that is, setting values indicating that search conditions are not designated with respect to the items.

When the INFO button 220 is selected, the CPU 101 adds/deletes the check mark 221 to/from an item indicated by the cursor 210.

Search Display Processing

Search display processing to search for an image recorded on the recording medium 108 and display the searched image on the display 105 will be described using a flowchart shown in FIG. 3. Respective processing in the flowchart is realized when the CPU 101 develops a program stored in the non-volatile memory 103 into the memory 102 and performs the developed program. Note that the CPU 101 starts the processing of the flowchart shown in FIG. 3 when the set image search condition item 205 is selected by the user on the reproduction menu screen. Note that the search conditions of the respective items set when the user performed image search last time are assumed to be the search conditions shown in FIG. 2B at the start of the flowchart.

In S301, the CPU101 determines whether the recording medium 108 that records an image serving as a search target has been changed to one different from the recording medium 108 used in previous search. More specifically, the CPU 101 determines in S301 that, when "information indicating that a recording medium has been changed" has been stored in the non-volatile memory 103 as "information indicating whether a recording medium has been changed," the recording medium 108 has been changed to one different from the recording medium 108 used in the previous search. The processing proceeds to S302 when the recording medium 108 has not been changed, or proceeds to S303 when the recording medium 108 has been changed.

In S302, the CPU 101 displays the search condition 212a of the date item 232 and the search condition 213a of the folder item 233, which were stored in the non-volatile memory 103 in the previous search, on the display 105 as a part of the condition setting screen as shown in FIG. 2B. Note that as for the check marks 221 added to the date item 232 and the folder item 233, the CPU 101 also takes over and display their statuses that were stored in the non-volatile memory 103 in the previous search. Note that the display of search conditions indicates the use of the search conditions as candidates used for search (settings).

Figure 2C:
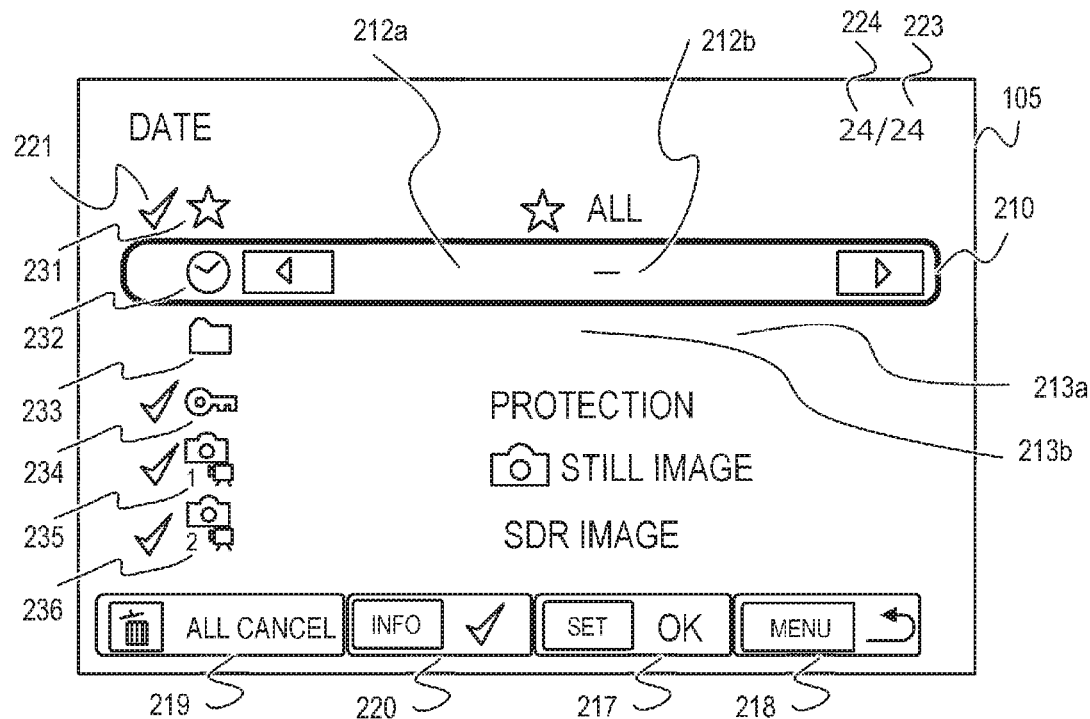

In S303, the CPU 101 displays an initial value 212b and an initial value 213b on the display 105 as for the search condition 212a of the date item 232 and the search condition 213a of the folder item 233, respectively, as a part of the condition setting screen as shown in FIG. 2C. In the present embodiment, each of the initial value 212b and the initial value 213b is a setting value indicating no condition (NULL), that is, a setting value indicating that a search condition is not designated with respect to the item.

Note that in S303, the CPU 101 may take over statuses stored in the non-volatile memory 103 as for the check marks 221 added to the date item 232 and the folder item 233. Alternatively, the CPU 101 may not add the check marks 221 to prevent the search conditions of the date item 232 and the folder item 233 from being used for search.

In S304, the CPU 101 displays search conditions, which were stored in the non-volatile memory 103 in the previous search, as for items other than the date item 232 and the folder item 233 on the condition setting screen as shown in FIGS. 2B and 2C. Note that the CPU 101 also takes over and displays (uses) statuses, which were stored in the non-volatile memory 103 in the previous search, as for the check marks 221 added to the items other than the date item 232 and the folder item 233. Here, the items other than the date item 232 and the folder item 233 include the rating item 231, the protection item 234, the file-type item 235, and the file-type item 236. That is, at a condition display time at which the search conditions of a plurality of items are displayed in a state in which the recording medium 108 has been changed, the initial values are displayed as search conditions as for a date and a folder (that is, conditions stored in the non-volatile memory 103 are not used as setting candidates). As for the other items, search conditions stored in the non-volatile memory 103 are displayed. On the other hand, when the condition setting screen is displayed again without the change of the recording medium 108 after the previous operation of the condition setting screen rather than the condition display time (the state in which the recording medium 108 has been changed), the search conditions stored in the non-volatile memory 103 are also displayed as for a date and a folder.

In S305, the CPU 101 sets a refinement condition (AND condition: logical sum condition) that is the logical sum of the search conditions of all the items (search items) to which the check marks 221 have been added. Then, the CPU 101 performs search processing to search for an image matching the refinement condition. Accordingly, in the present embodiment, the CPU 101 is also a search unit that searches for an image matching (hitting) the refinement condition. Note that when the electronic device 100 does have the function of adding the check marks 221, the refinement condition may be a condition that is the logical sum of all the search conditions of items displayed on the condition setting screen.

In S306, the CPU 101 determines whether an image matching (hitting) the refinement condition in the search processing performed in S305 exists. Here, the CPU 101 displays, on the display 105, the number of images (the numerical value of a numerator denoted by numeral 224) matching the refinement condition relative to the number of all images (the numerical value of a denominator denoted by numeral 223) that serve as search targets recorded on the recording medium 108. Then, the processing proceeds to S307 when the matching image does not exist, and proceeds to S308 when the matching image exists.

In S307, the CPU 101 displays the SET button 217 in an invalid state on the condition setting screen (not shown). In the invalid state, the SET button 217 is displayed in a gray-out state that is a display state that allows the user to discriminate an invalid state. Even if the user touches the SET button 217 in this state, the touch operation is ignored (NO is determined in S311 that will be described later). Further, even if a SET button that is a press button included in the operation unit 106 is pressed, the operation is ignored (NO is determined in S311 that will be described later).

In S308, the CPU 101 displays the SET button 217 in a valid state on the condition setting screen. That is, unlike S307, the CPU 101 brings about a state in which a user operation on the SET button 217 and the SET button that is a press button included in the operation unit 106 is accepted. FIGS. 2B and 2C are display examples of a case in which the SET button 217 has been brought into a valid state.

In S309, the CPU 101 displays the image matching the refinement condition on the display 105. Here, the CPU 101 displays the image matching the refinement condition in, for example, a list form (multiple display) on the condition setting screen as a background with respect to items for setting search conditions. More specifically, the items of the respective search conditions of the condition setting screen are displayed in a semi-transparent state, and the matching image is displayed as a background so as to becomes transparent. That is, in S309, the CPU 101 does not display the detail of the image matching the refinement condition but displays the whole picture of the image matching the refinement condition as a background.

In S310, the CPU 101 determines whether the MENU button 218 in the condition setting screen has been touched or whether the MENU button that is a press button included in the operation unit 106 has been pressed. When the MENU button 218 has been touched or when the MENU button that is a press button included in the operation unit 106 has been pressed, condition setting processing for image search is finished. Then, the CPU 101 closes the condition setting screen to return to the display of the reproduction menu screen of FIG. 2A. Otherwise, the processing proceeds to S311.

In S311, the CPU 101 determines whether the SET button 217 has been touched or whether the SET button that is a press button included in the operation unit 106 has been pressed. The processing proceeds to S313 when the SET button 217 has been touched or when the SET button that is a press button included in the operation unit 106 has been pressed. Otherwise, the processing proceeds to S312. Note that No is determined in S311 when the SET button 217 has been brought into an invalid state.

In S312, the CPU 101 performs the condition setting processing. The condition setting processing will be described in detail later using FIG. 4. Then, the processing proceeds to S305, and the CPU 101 searches for an image under a refinement condition corresponding to the condition setting processing of S312.

In S313, the CPU 101 stores the current search condition (refinement condition) in the non-volatile memory 103. At this time, the CPU 101 stores both the search conditions of all the items displayed on the condition setting screen and the added statuses of the check marks 221. Accordingly, in the present embodiment, the CPU 101 is also a storage control unit that controls the storage of search conditions in the non-volatile memory 103. Note that when "information indicating that a storage medium has been changed" is stored in the non-volatile memory 103, the CPU 101 deletes the "information indicating that a storage medium has been changed" from the non-volatile memory 103.

In S314, the CPU 101 starts refinement reproduction to display the image matching the refinement condition on the display 105 in detail. When the refinement reproduction starts, the condition setting processing for image search is finished to transition to an image reproduction screen shown in FIG. 2D.

Refinement Reproduction

Figure 2D:
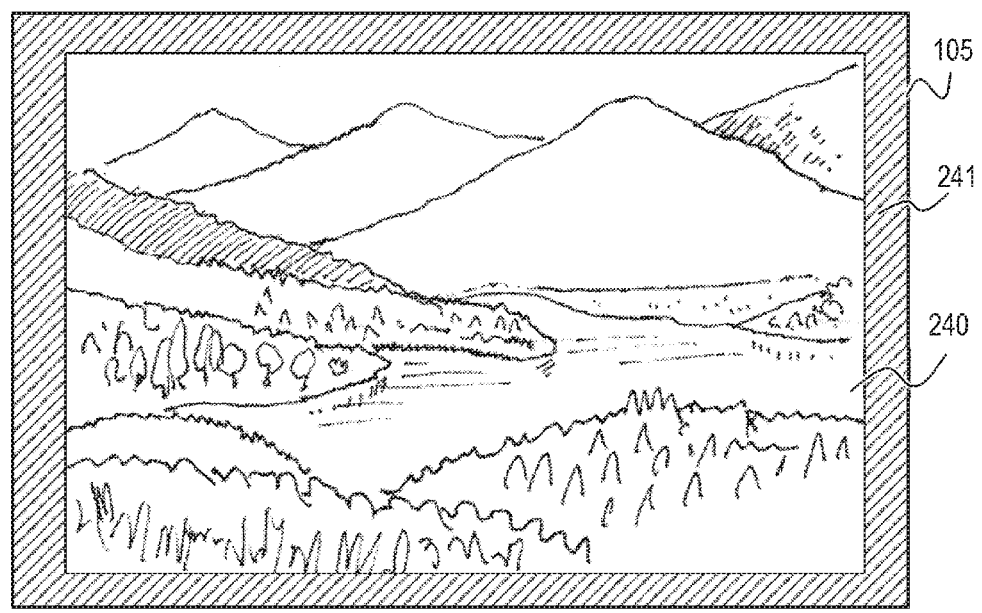

FIG. 2D shows the display of the display 105 in a state in which refinement reproduction has been performed. In this state, an image 240 and a frame line 241 surrounding the image 240 are displayed.

The image 240 is one of images matching a refinement condition among images recorded on the recording medium 108. FIG. 2D shows an example during single reproduction (full-screen reproduction) in which only one image is displayed. Accordingly, an image not matching the refinement condition is not displayed at the refinement reproduction. Note that when an image forwarding/rewinding instruction is provided by the user, the CPU 101 displays a next/previous image among the images matching the refinement condition. Note that although one image is displayed in the present embodiment, any number of images among the images matching the refinement condition may be displayed.

Further, in order to cancel the refinement reproduction, the user presses the MENU button included in the operation unit 106, selects the reproduction tab 207 on the reproduction menu screen, and selects the all-cancel button 219.

The frame line 241 is a frame line indicating that the refinement reproduction has been performed. By the frame line 241, the user is allowed to definitely recognize a state in which the refinement reproduction has been performed. Note that a form indicating the refinement reproduction is not limited to the frame line but any form may be used so long as the refinement reproduction that has been performed is indicated.

Condition Setting Processing: S312

FIG. 4 is a flowchart showing the condition setting processing for search performed in S312. Respective processing in the flowchart is realized when the CPU 101 develops a program stored in the non-volatile memory 103 into the memory 102 and performs the developed program.

In S401, the CPU 101 determines whether the all-cancel button 219 has been touched or whether a dust-box button that is a press button included in the operation unit 106 has been pressed. The processing proceeds to S402 when the all-cancel button 219 has been touched or when the dust-box button that is a press button included in the operation unit 106 has been pressed. Otherwise, the processing proceeds to S403.

In S402, the CPU 101 performs processing to set the conditions of all the items at initial values (initial settings) and displays the initial values on the display 105. In the present embodiment, the initial values are setting values indicating no conditions (NULL), that is, setting values indicating that search conditions are not designated with respect to the items. Note that at this time, the CPU 101 cancels the check marks 221 added to all the items.

In S403, the CPU 101 determines whether a user operation to change a selected item has been performed. Here, the selected item is an item that has been surrounded (selected) by the cursor 210. The CPU 101 determines YES when an up-and-down key included in the operation unit 106 is operated or when an item different from a currently-selected item is touched on the condition setting screen. When YES is determined, the CPU 101 changes the selected item and moves the cursor 210 to a newly-selected item in S404. Note that when the selected item is not changed in S403, the processing proceeds to S405.

In S405, the CPU 101 determines whether the selected item is a date or a folder. The processing proceeds to S406 when the selected item is a date or a folder. Otherwise (that is, when the selected item is any of rating, protection, and file types), the processing proceeds to S408. Here, the processing may proceed to S406 when the alternative of the search condition of the selected item is determined on the basis of the recording status of the recording medium 108. Otherwise, the processing may proceed to S408. Accordingly, even if the selected item is any of rating and file types, the processing may proceed to S406 when the alternative of the search condition is determined on the basis of the recording status of the recording medium 108.

In S406, when the selected item is a date, the CPU 101 scans (searches for) at least a part inside the recording medium 108 and detects a date existing as the shooting date (file creation date) of a recorded image (content). On the other hand, when the selected item is a folder, the CPU 101 scans (searches for) at least a part inside the recording medium 108 and detects a recorded folder. Here, the folder that is a scanning target may include all folders existing in the recording medium 108 or only a folder in which a reproducible image file is stored. It is more preferable that the folder serving as a scanning target includes only a folder in which a reproducible image file is stored since the possibility of the nonexistence of an image matching a search condition may be reduced when the folder of an alternative is selected at image search.

In S407, the CPU 101 sets the information detected in the scanning processing of S406 as the alternative of the search condition of the selected item. When the selected item is a date, the CPU 101 sets (presents or displays) the date detected in the scanning processing of S406 as a selectable alternative. The CPU 101 does not set an undetected date as an alternative. When the selected item is a folder, the CPU 101 sets (presents or displays) the folder detected in the processing of S406 as a selectable alternative. The CPU 101 does not set an undetected folder as an alternative.

In S408, the CPU 101 determines whether an operation to change the search condition of the selected item has been performed. For example, any of alternatives settable as search conditions may be selected by the operation of a right-and-left key included in the operation unit 106 or a touch operation on the direction instruction icons 210*a* and 210*b* displayed inside the cursor 210 on the display 105. Note that when the selected item is a date or a folder, the selection of search conditions other than the alternative set in S407 is not allowed. That is, search conditions selectable only from the alternatives set in S407 as for the date item 232 and the folder item 233. Note that as for the rating item 231, the protection item 234, the file-type item 235, and the file-type item 236, search conditions are selectable from alternatives set in advance. The processing proceeds to S409 when the operation to change the selected item has been performed. Otherwise, the processing proceeds to S410.

In S409, the CPU 101 adds (displays) the check mark 221 to the currently-selected item (item of which the search condition has been changed). Then, the processing proceeds to S305 of FIG. 3, and the CPU 101 performs image search in consideration of the added condition.

In S410, the CPU 101 determines whether the INFO button 220 has been touched or whether an INFO button that is a press button included in the operation unit 106 has been pressed. The processing proceeds to S411 when the INFO button 220 has been touched or when the INFO button that is a press button included in the operation unit 106 has been pressed. Otherwise, the processing proceeds to S310.

In S411, the CPU 101 determines whether the check mark 221 has been added to the selected item. Then, the processing proceeds to S412 when the check mark 221 has not been added, or proceeds to S413 when the check mark 221 has been added.

In S412, the CPU 101 adds (displays) the check mark 221 to the selected item. Then, the processing proceeds to S305 of FIG. 3 described above, and the CPU 101 performs image search in consideration of the search condition to which the check mark 221 has been added in S412.

In S413, the CPU 101 removes (unchecks) the check mark 221 from the selected item. Then, the processing proceeds to S305 of FIG. 3 described above, and the CPU 101 performs image search without considering the search condition of the item of which the check mark 221 has been removed in S413.

Alternatives of Search Conditions

As described above, alternatives selectable by the user are determined in the search conditions of the rating item 231, the date item 232, the folder item 233, the protection item 234, the file-type item 235, and the file-type item 236. Hereinafter, the alternatives will be described.

The alternatives of a date and a folder are determined on the basis of the recording status of the recording medium 108. This is because the number of the alternatives becomes infinite if the alternatives are determined in advance regardless of the recording status of the recording medium 108. For example, the number of the alternatives of a date becomes 365 for one year where no reference information is provided, and becomes a huge number for a plurality of years (i.e., alternatives of 365×corresponding years). Therefore, it is not easy to select a target date using the right-and-left key included in the operation unit 106 or the direction instruction icons 210*a* and 210*b*. The same applies to a folder name, and the folder name possibly has a wide range of names. For this reason, the alternatives are narrowed down to a date and a folder existing as contents recorded on the recording medium 108, whereby user's selection is facilitated. As described above, as for items having a huge number of (at least a prescribed number) search conditions that possibly serve as alternatives, settable search conditions are changed depending on the recording status of the recording medium 108. When a recording medium that serves as a search target has been changed, the conditions are not taken over.

In other words, "items in which different conditions are settable depending on a recording medium" are items having a huge number of (at least a prescribed number) search conditions that possibly serve as alternatives (candidates) when the recording status of the recording medium 108 that serves as a search target are not taken into consideration. The prescribed number is about 10 to 100 when operability is taken into consideration.

On the other hand, the alternatives of rating, protection, file types, and the like are presented as alternatives determined in advance regardless of the recording status of the recording medium 108. This is because the number of candidates for the alternatives is originally small. For example, the rating has only five alternatives of 1 to 5, and the protection has only two alternatives of "protection" and "unprotection." Accordingly, the number of alternatives does not become huge even if no reference information is provided, and user's operability to select any of the alternatives does not greatly reduce. As described above, as for items having a small number of (equal or less than a prescribed number) search conditions that possibly serve as alternatives, settable search conditions are fixed regardless of the recording status of the recording medium 108. When a recording medium that serves as a search target has been changed, the conditions are taken over.

In other words, "items in which the same conditions are settable regardless of a recording medium" are items having a small number of (equal or less than a prescribed number) search conditions that possibly serve as alternatives (candidates) when the recording status of the recording medium 108 that serves as a search target are not taken into consideration. As described above, the prescribed number is about 10 to 100 when operability is taken into consideration.

Effects

As described above, the CPU 101 displays the initial values in the date item 232 and the folder item 233 when a recording medium on which a search target is recorded has been changed from one used in previous search in the processing of S301 and S303. Here, since the date item 232 and the folder item 233 have different settable conditions depending on an image recorded on the recording medium 108, the CPU 101 restores the search conditions to the initial values with a change in the recording medium 108. As a result, search processing under unnecessary conditions is not performed in S305. Therefore, time for search processing to search for an image recorded on the recording medium 108 may be reduced.

Further, the number of images matching the refinement condition is indicated in advance in the processing of S306, whereby it is possible to prevent the setting of a search condition under which a matching image may not be found with a change in the recording medium 108 and quickly display an image matching the refinement condition.

In addition, the CPU 101 displays search conditions, which were stored in previous search, in the date item 232 and the folder item 233 when the recording medium 108 on which a search target is recorded has not been changed from one used in the previous search in the processing of S301 and S302. As a result, the user is allowed to save time and effort for resetting conditions to perform search under the same conditions again.

As described above, the preparation of an image that serves as a display target may be quickly completed according to the present embodiment. That is, the electronic device according to the present embodiment may effectively take over the search conditions of a content used in previous search.

Note that the determination of S301 is not limited to a determination as to whether the recording medium 108 connected to the same recording medium I/F 107 has been replaced. For example, YES may also be determined when a recording medium 108 that serves as a search target among a plurality of recording media 108 attached to a plurality of recording medium slots (slots A and B) at the same time has been changed. That is, YES may also be determined when a search target is changed from a recording medium 108A attached to the slot A to a recording medium 108B attached to the slot B. Further, the same applies to a case in which a search target is changed from a built-in memory to a replaceable memory (such as a memory card). Further, in the present embodiment, a determination as to whether the previous search conditions are displayed or the initial values are displayed is made depending on whether the recording medium 108 connected to the recording medium I/F 107 has been replaced. However, the determination is not limited to the replacement of the recording medium 108. That is, a case in which a plurality of storage destinations (for example, folders) exist inside the recording medium 108 is taken into consideration. When conditions are displayed to perform search with respect to one of the plurality of storage destinations and then conditions are displayed with respect to another storage destination, it may be determined that the storage destination has been changed (Yes in S301). Then, initial values may be displayed and set as for the search items of a date and a folder.

Further, an image is described above as an example of a searched content. However, without being limited to the example, the present embodiment is also applicable to the search of any content such as a document file and a sound file.

Further, a date and a folder are described above as an example of items in which settable search conditions are different depending on the recording status of the recording medium 108 that serves as a search target. Without being limited to the example, the items may include a file name, position information for each content added on the basis of a GPS or the like when the content is recorded, information on a device on which a content is recorded, or the like.

Further, rating, protection, file types, and the like are described above as an example of items in which search conditions remain the same regardless of the recording status of a recording medium (without relying on the recording medium) that serves as a search target. Without being limited to the example, the items may include, for example, the presence or absence of transfer, the presence or absence of editing, or the like.

Further, NULL is described above as an example of the initial values of items that do not take over previously-used search conditions when a recording medium that serves as a search target has been changed. Without being limited to the example, the initial values (initial settings) may be set under a specific condition. For example, the initial values may include the first day (like Jan. 1, 2000) settable as the clock function of a device and the first day of a date searched from a recording medium after change.

First Modified Example

Note that instead of the processing of S301 of the first embodiment, the CPU 101 may determine whether the power of the electronic device 100 has been turned off and then turned on again since previous search (whether the power has been turned off since the previous search). The processing proceeds to S303 when the power has ever been turned off since the previous search. Otherwise, the processing proceeds to S302.

This is because a possibility that the recording medium 108 on which a search target (content) is recorded has been changed since the previous search is higher than usual when the power of the electronic device 100 is turned off. In the first embodiment, the electronic device 100 capable of detecting the attachment/detachment of the recording medium 108 when the power is being turned off is described. However, according to the first modified example, the present invention is applicable even to an electronic device 100 not capable of detecting the attachment/detachment of a recording medium 108 when power is being turned off. When the recording medium 108 has been changed during a period in which the power of the electronic device 100 is turned off, the date item and the folder item are caused to have the search conditions of alternatives set on the basis of the recording status of the recording medium 108 before replacement. There is a possibility that a matching image (content) does not exist when the electronic device 100 performs search using the search conditions. Therefore, in consideration of a possibility that the undetectable recording medium 108 has been replaced during the period in which the power is turned off, the CPU 101 restores the search conditions of the date and the folder to initial values when determining that the power of the electronic device 100 has been turned off and then turned on again. As a result, search processing under unnecessary search conditions in S305 is prevented. Therefore, time for search processing may be reduced.

Further, in the processing of S306 of FIG. 3, it is possible to prevent in advance the setting of search conditions under which a matching image does not exist with a change in (at the replacement of) a recording medium and quickly display an image matching a refinement condition.

According to the present invention, the search conditions of a content used in previous search may be more effectively taken over.

Note that the above various control performed by the CPU 101 in the first embodiment and the first modified example may be performed by one hardware, or a plurality of hardware (for example, a plurality of processors or circuits) may share the processing with each other to perform the control of the whole device.

Further, the present invention is described in detail above on the basis of the preferred embodiments. However, the present invention is not limited to such specific embodiments, and various modes within a range not departing from the spirit of the invention are also included in the present invention. In addition, the above respective embodiments only describe an embodiment of the present invention and may be appropriately combined together.

Further, the above embodiments describe, as an example, a case in which the present invention is applied to an electronic device such as a digital camera and a personal computer. Without being limited to the example, the present invention is applicable to electronic devices in which the search targets of contents may be changed. That is, the present invention is applicable to personal computers, PDAs, mobile phone terminals, portable image viewers, printers with a display, digital photo frames, music players, game machines, electronic-book readers, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-079313, filed on Apr. 18, 2019, which is hereby incorporated by reference herein in its entirety.

What is claimed is:

1. An electronic device comprising:
at least one processor: and
at least one memory coupled to the processor storing instructions that, when executed by the processor, cause the at least one processor to function as:
a display control unit configured to control a setting screen indicating search conditions that are set for each of a plurality of search items, including a first search item and a second search item displayed on a display, wherein the search conditions for the plurality of search items in the setting screen may be changed in accordance with a user operation;
a control unit configured to determine whether the storage destination serving as the search target is disconnected and changed; and
a search unit configured to search for a content that matches a refinement condition that is determined based on the search conditions for the plurality of search items set in the setting screen, from a storage destination serving as a search target, wherein
when determining that the storage destination serving as the search target is changed, the display control unit 1) displays a search condition that was set for the first search item before the storage destination is changed, as the first search item on the setting screen, and 2) displays a predetermined search condition, without displaying a search condition that was set for the second search item before the storage destination is changed, as the second search item on the setting screen, wherein the second search item is different from the first search item,
when determining that the storage destination serving as the search target has been disconnected but not changed, the display control unit 1) displays a search condition that was set for the first search item before the storage destination is disconnected, as the first search item on the setting screen, and 2) displays a search condition that was set for the second search item before the storage designation is disconnected, as the second search item on the setting screen, wherein the second search item is different from the first search item, and the display control unit changes the search conditions for the plurality of search items to conditions corresponding to the user operation on the setting screen, after displaying the setting screen in a case where the storage destination is changed.

2. The electronic device according to claim 1, wherein the case in which the storage destination serving as the search target is changed includes a case in which a recording medium serving as a search target is changed.

3. The electronic device according to claim 1, wherein the case in which the storage destination serving as the search target is changed includes a case in which a folder storing a content serving as a search target is changed.

4. The electronic device according to claim 1, wherein
the display control unit is further configured to 1) determine whether the storage destination serving as the search target is changed or not, based on at least any one of a recorded capacity, a remaining capacity, the number of files, and the number of folders in the storage destination, and 2) control such that the setting screen corresponding to a result of the determination is displayed.

5. The electronic device according to claim 1, wherein
the first search item is a search item in which a settable search condition does not depend on the storage destination serving as the search target, and
the second search item is a search item in which a settable search condition depends on the storage destination serving as the search target.

6. The electronic device according to claim 1, wherein
the first search item is a search item in which the number of candidates capable of serving as search conditions in a case in which a recording status of the storage destination serving as the search target is not taken into consideration is equal or less than a prescribed number, and
the second search item is a search item in which the number of candidates capable of serving as search conditions in a case in which a recording status of the storage destination serving as the search target is not taken into consideration exceeds the prescribed number.

7. The electronic device according to claim 1, wherein the first search item includes at least one of items of rating, protection, and a file type.

8. The electronic device according to claim 1, wherein
the setting screen presents a candidate of a search condition regardless of the storage destination, as an alternative that is settable as a search condition, as for the first search item, and
the setting screen presents a candidate of a search condition based on the storage destination, as an alternative that is settable as a search condition, as for the second search item.

9. The electronic device according to claim 1, wherein the second search item includes at least one of items comprising a date and a folder.

10. The electronic device according to claim 8, wherein the setting screen presents the candidate of the search condition based on information read from the storage destination, as for the second search item.

11. The electronic device according to claim 1, wherein the predetermined search condition is a search condition of an initial setting.

12. The electronic device according to claim 11, wherein the initial setting is a setting indicating that a search condition of the second search item is not designated.

13. The electronic device according to claim 1, wherein the display control unit is configured to display the number of contents matching the refinement condition searched by the search unit together with the search conditions set for each of the plurality of search items, in the setting screen.

14. The electronic device according to claim 13, wherein the refinement condition is a logical sum of search conditions of designated search items among the plurality of search items.

15. A method for controlling an electronic device, comprising:
a display control step of performing control of setting a screen indicating search conditions that are set for each of a plurality of search items, including a first search item and a second search item, and displaying the plurality of search terms, wherein the search conditions for the plurality of displayed search items may be changed in accordance with a user operation;
a storage control step of performing control to store the search condition set in the display control step;
a determining step of determining whether the storage destination serving as the search target is disconnected and changed; and
a search step of searching for a content that matches a refinement condition that is determined based on the search conditions for the plurality of search items set in the display control step from a storage destination serving as a search target, wherein
when determining that the storage destination, serving as the search target, is changed, 1) displaying a search condition that was set for the first search item before the storage destination is changed, as the first search item on the setting screen, and 2) displaying a predetermined search condition, without displaying a search condition that was set for the second search item before the storage destination is changed, as the second search item on the setting screen, wherein the second search item is different from the first search item,
when determining that the storage destination serving as the search target has been disconnected but not changed 1) displaying a search condition that was set for the first search item before the storage destination is disconnected, as the first search item on the setting screen, and 2) displaying a search condition that was set for the second search item before the storage designation is disconnected, as the second search item on the setting screen, wherein the second search item is different from the first search item, and
changing the search conditions for the plurality of search items to conditions corresponding to the user operation on the setting screen, after displaying the setting screen in a case where the storage destination is changed.

16. A non-transitory computer readable medium that stores a program, wherein
the program causes a computer to execute a method for controlling an electronic device,
the method including:
a display control step of performing control of setting a screen indicating search conditions that are set for each of a plurality of search items, including a first search item and a second search item, and displaying the plurality of search terms, wherein the search conditions for the plurality of displayed search items may be changed in accordance with a user operation;

a storage control step of performing control to store the search condition set in the display control step;

a determining step of determining whether the storage destination serving as the search target is disconnected and changed; and a search step of searching for a content that matches a refinement condition that is determined based on the search conditions for the plurality of search items set in the display control step from a storage destination serving as a search target, wherein when determining that the storage destination, serving as the search target, is changed, 1) displaying a search condition that was set for the first search item before the storage destination is changed, as the first search item on the setting screen, and 2) displaying a predetermined search condition, without displaying a search condition that was set for the second search item before the storage destination is changed, as the second search item on the setting screen, wherein the second search item is different from the first search item, when determining that the storage destination serving as the search target has been disconnected but not changed 1) displaying a search condition that was set for the first search item before the storage destination is disconnected, as the first search item on the setting screen, and 2) displaying a search condition that was set for the second search item before the storage designation is disconnected, as the second search item on the setting screen, wherein the second search item is different from the first search item, and changing the search conditions for the plurality of search items to conditions corresponding to the user operation on the setting screen, after displaying the setting screen in a case where the storage destination is changed.

* * * * *